US010387550B2

(12) United States Patent
Simske et al.

(10) Patent No.: US 10,387,550 B2
(45) Date of Patent: Aug. 20, 2019

(54) TEXT RESTRUCTURING

(71) Applicant: Hewlett-Packard Development Company, L.P., Houston, TX (US)

(72) Inventors: Steven J Simske, Fort Collins, CO (US); A. Marie Vans, Ft. Collins, CO (US); Marcelo Riss, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/519,068

(22) PCT Filed: Apr. 24, 2015

(86) PCT No.: PCT/US2015/027445
§ 371 (c)(1),
(2) Date: Apr. 13, 2017

(87) PCT Pub. No.: WO2016/171709
PCT Pub. Date: Oct. 27, 2016

(65) Prior Publication Data

US 2017/0249289 A1 Aug. 31, 2017

(51) Int. Cl.
*G06F 16/33* (2019.01)
*G06F 16/34* (2019.01)
(Continued)

(52) U.S. Cl.
CPC ........ *G06F 17/2264* (2013.01); *G06F 16/334* (2019.01); *G06F 16/345* (2019.01); *G06F 16/353* (2019.01); *G06F 17/2785* (2013.01)

(58) Field of Classification Search
None
See application file for complete search history.

(56) References Cited

U.S. PATENT DOCUMENTS 5,978,820 A 11/1999 Mase et al.
6,289,304 B1 * 9/2001 Grefenstette ......... G06F 16/345 704/9
(Continued)

OTHER PUBLICATIONS

Inouye, David, and Jugal K. Kalita. "Comparing twitter summarization algorithms for multiple post summaries." Privacy, Security, Risk and Trust (PASSAT) and 2011 IEEE Third Inernational Conference on Social Computing (SocialCom), 2011 IEEE Third International Conference on. IEEE, 2011.*
(Continued)

*Primary Examiner* — Jonathan C Kim
(74) *Attorney, Agent, or Firm* — Tong, Rea, Bentley & Kim, LLC

(57) ABSTRACT

In example implementations, a plurality of re-structured version of texts is generated for each one of a plurality of different documents by applying a plurality of text summarization methods to each one of the plurality of different documents. An effectiveness score is calculated for each one of the plurality of text summarization methods to determine the text summarization method with the highest effectiveness score for an application. The plurality of re-structured versions of text for each one of the plurality of different documents that is generated by the text summarization method that has the highest effectiveness score is stored to be used in the application.

13 Claims, 5 Drawing Sheets

300

(51) Int. Cl.

| | |
|---|---|
| ***G06F 16/35*** | (2019.01) |
| ***G06F 17/22*** | (2006.01) |
| ***G06F 17/27*** | (2006.01) |

(56) References Cited

U.S. PATENT DOCUMENTS

| | | | | |
|---|---|---|---|---|
| 7,310,633 | B1 * | 12/2007 | Wang | G06F 16/338 707/742 |
| 7,451,395 | B2 | 11/2008 | Brants et al. | |
| 7,509,572 | B1 * | 3/2009 | Melander | G06F 17/2247 715/234 |
| 7,607,083 | B2 | 10/2009 | Gong et al. | |
| 7,752,204 | B2 | 7/2010 | Kao et al. | |
| 8,046,351 | B2 * | 10/2011 | Song | G06F 16/951 707/710 |
| 8,176,418 | B2 | 5/2012 | McKeown | |
| 8,417,715 | B1 * | 4/2013 | Bruckhaus | G06Q 10/04 707/758 |
| 8,489,632 | B1 * | 7/2013 | Breckenridge | G06K 9/6288 707/778 |
| 2003/0167245 | A1 * | 9/2003 | Murata | G06F 17/277 706/46 |
| 2004/0133560 | A1 * | 7/2004 | Simske | G06F 16/313 |
| 2004/0153309 | A1 | 8/2004 | Lin et al. | |
| 2004/0225667 | A1 * | 11/2004 | Hu | G06F 16/345 |
| 2005/0091203 | A1 * | 4/2005 | Liu | G06F 16/345 |
| 2005/0203970 | A1 | 9/2005 | McKeown et al. | |
| 2005/0246410 | A1 | 11/2005 | Chen et al. | |
| 2007/0061356 | A1 * | 3/2007 | Zhang | G06F 17/277 |
| 2007/0245379 | A1 * | 10/2007 | Agnihortri | H04N 7/163 725/46 |
| 2008/0189074 | A1 * | 8/2008 | Lin | G06F 16/345 702/181 |
| 2008/0288859 | A1 | 11/2008 | Yuan et al. | |
| 2009/0259642 | A1 * | 10/2009 | Cao | G06F 16/345 |
| 2011/0071817 | A1 * | 3/2011 | Siivola | G06F 17/275 704/8 |
| 2011/0161263 | A1 * | 6/2011 | Lee | G06F 17/18 706/13 |
| 2012/0150849 | A1 * | 6/2012 | Urban | G06F 16/7847 707/725 |
| 2013/0290336 | A1 * | 10/2013 | Moriguchi | G06F 16/285 707/737 |
| 2013/0290430 | A1 * | 10/2013 | Yung | H04L 67/22 709/204 |
| 2017/0053027 | A1 * | 2/2017 | Simske | G06F 16/3334 |
| 2017/0109439 | A1 * | 4/2017 | Simske | G06F 16/345 |
| 2017/0147570 | A1 * | 5/2017 | Simske | G06F 16/93 |
| 2017/0161372 | A1 * | 6/2017 | Fern ndez | G06F 17/218 |
| 2017/0213130 | A1 * | 7/2017 | Khatri | G06F 16/345 |
| 2017/0228591 | A1 * | 8/2017 | Simske | G06Q 99/00 |
| 2017/0249289 | A1 * | 8/2017 | Simske | G06F 17/2264 |
| 2017/0309194 | A1 * | 10/2017 | Simske | G06N 20/00 |

OTHER PUBLICATIONS

Goldstein, Jade, et al. "Summarizing text documents: sentence selection and evaluation metrics." Proceedings of the 22nd annual international ACM SIGIR conference on Research and development in information retrieval. ACM, 1999.*

Inouye, David, and Jugal K. Kalita. "Comparing twitter summarization algorithms for multiple post summaries." Privacy, Security, Risk and Trust (PASSAT) and 2011 IEEE Third Inernational Conference on Social Computing (SocialCom), 2011 IEEE Third International Conference on. IEEE, 2011. (Year: 2011).*

Goldstein, Jade, et al. "Summarizing text documents: sentence selection and evaluation metrics." Proceedings of the 22nd annual international ACM SIGIR conference on Research and development in information retrieval. ACM, 1999. (Year: 1999).*

Fattah, M.A. et al, "A Hybrid Machine Learning Model for Multi-document Summarization", Jun. 2014.

Hassel, M, "Resource Lean and Portable Automatic Text Summarization", 2007.

* cited by examiner

104

TEXT RESTRUCTURING

BACKGROUND

Robust systems can be built by using complementary machine intelligence approaches. Text summarization is a means of generating intelligence, or "refined data," from a larger body of text. Text summarization can be used as a decision criterion for other text analytics, with its own idiosyncrasies.

DETAILED DESCRIPTION

The present disclosure broadly discloses a method and non-transitory computer-readable medium for re-structuring text. As discussed above, text summarization methods may be used to generate re-structured versions of text of an associated document. A text summarization method may include more than one primary summarization engine in combination, an ensemble, a meta-algorithmic combination, and the like. However, not all text summarization methods are equally effective at generating a restructured text of a document for a particular application. In addition, different text summarization methods may be more effective than other text summarization methods depending on the type of application that uses the restructured text or depending on the function of the filtered text.

Examples of the present disclosure provide a novel method for objectively evaluating each text summarization method for a particular application and selecting the most effective text summarization method for the particular application. The re-structured versions of text that are generated for a variety of different documents by the most effective text summarization method may then be used for the particular application.

Figure 1:
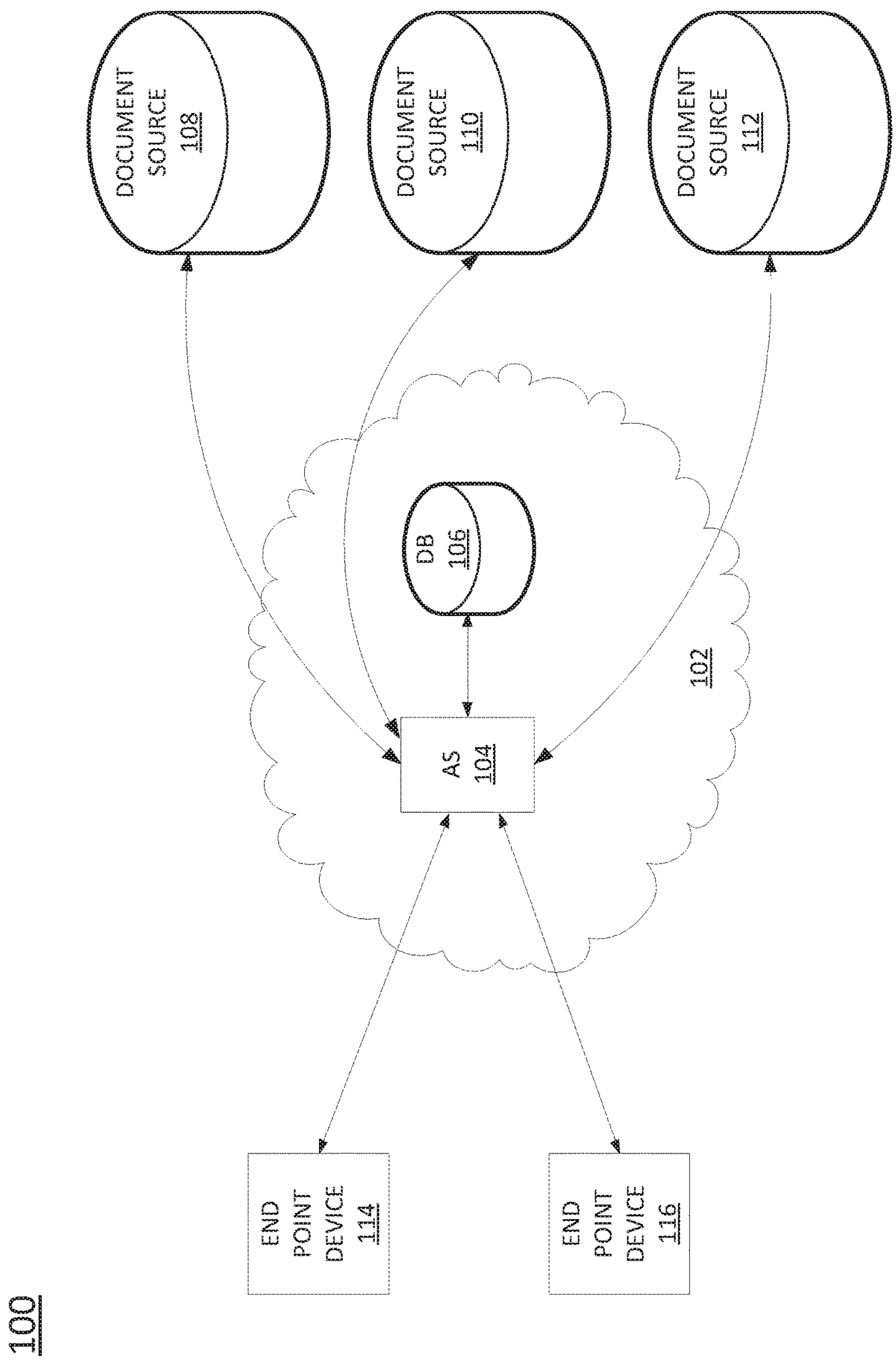
FIG. 1 is a block diagram of an example communication network of the present disclosure.

FIG. 1 illustrates an example communication network 100 of the present disclosure. In one example, the communication network 100 includes an Internet protocol (IP) network 102. In one example, the IP network 102 may include an apparatus 104 (also referred to as an application server (AS) 104) and a database (DB) 106. Although only a single apparatus 104 and a single DB 106 are illustrated in FIG. 1 it should be noted that the IP network 102 may include more than one apparatus 104 and more than one DB 106.

In one example, the AS 104 and DB 106 may be maintained and operated by a service provider. In one example, the service provider may be a provider of text summarization services. For example, text from a document may be re-structured into a summary form that may then be searched or used for a variety of different applications, as discussed below.

It should be noted that the IP network 102 has been simplified for ease of explanation. The IP network 102 may include additional network elements not shown (e.g., routers, switches, gateways, border elements, firewalls, and the like). The IP network 102 may also include additional access networks that are not shown (e.g., a cellular access network, a cable access network, and the like).

In one example, the apparatus 104 may perform the functions and operations described herein. For example, the apparatus 104 may be a computer that includes a processor and a memory that is modified to perform the functions described herein. For example, the apparatus 104 may access a variety of different document sources 108, 110 and 112 over the IP network 102, the Internet, the world wide web, and the like. In one example, the document sources 108, 110 and 112 may be a document on a webpage, scholarly articles stored in a database, electronic books stored in a server of an online retailer, news stories on a website, and the like. Although three document sources 108, 110 and 112 are illustrated in FIG. 1, it should be noted that the communication network 100 may include any number of document sources (e.g., more or less than three).

In one example, the processor of the apparatus 104 applies at least one text summarization method to documents to generate a re-structured version of the text for the documents using one of the at least one text summarization method. For example, if the processor of the apparatus 104 can apply ten different text summarization methods and 100 documents were obtained from the document sources 108, 110 and 112, then a re-structured version of text for each one of the 100 documents would be generated by each one of the ten different text summarization methods. In other words, 1000 re-structured versions of text would be generated for each one of the plurality of documents by applying each one of the plurality of text summarization methods to each one of the plurality of documents.

In one example, the text summarization method may be any type of available text summarization method. For example, text summarization methods may include automatic text summarizers based on text mining, based on word-clusters, based on paragraph extraction, based on lexical chains, based on a machine-learning approach, and the like. In one example, the text summarization methods may include meta-summarization methods. Meta-summarization methods include a combination of two or more different text summarization methods that are applied as a single method.

Thus, documents are transformed into a re-structured version of text by the processor of the apparatus 104. A re-structured version of text may be defined to also include a filtered set of text, a set of selected text, a prioritized set of text, a re-ordered or re-organized set of text, and the like. In other words, the apparatus 104 does not simply automate a manual process, but transforms one data set (e.g., the document) into a new data set (e.g., the re-structured version of text) that improves an application that uses the new data set, as discussed below. Said another way, the processor of the apparatus 104 creates a new document from the existing document by applying a text summarization method.

In one example, the processor of the apparatus 104 may generate the re-structured versions of text based upon a type of grouping of text elements within the document that are tagged. For example, a document may be broken into a plurality of different sections of text elements that are analyzed. The number of different sections of text elements that each document can be broken into may be variable depending on the document. The sections of text elements may be equal in length or may have a different length.

Each one of the plurality of different sections of text elements that are analyzed may be tagged. In one example, a tag may be a keyword that is included in the section of the text elements. The keyword may be a word that may be searched for or be relevant for a particular application (e.g., one of a variety of different applications, described below).

In one example, each one of the different sections of text elements may have an equal number of tags. Based upon a type of grouping, each one of the sections of text elements may be grouped together based upon at least one tag associated with the section of text elements. Table 1 below illustrates one greatly simplified example:

TABLE 1

EXAMPLE OF HOWA DOCUMENT IS RE-STRUCTURED

| Element Section | Tags | Loose Grouping | Intermediate Grouping | Tight Grouping |
|---|---|---|---|---|
| 1 | ABCDEF | S1 | S1 | S1 |
| 2 | ACFGHI | S1 | S1 | S1 |
| 3 | GJKLMN | S1 | S2 | S2 |
| 4 | LMOPQR | S1 | S2 | S3 |
| 5 | STUVWX | S2 | S3 | S4 |
| 6 | TUWXYZ | S2 | S3 | S4 |
| 7 | WZabcd | S2 | S3 | S5 |

In one example, a document is divided into 7 sections of text elements. Each text element section is tagged with six tags as represented by different upper case and lower case letters. In one example, the types of groupings include a loose grouping, an intermediate grouping, and a tight grouping. A loose grouping may require only one tag in common, an intermediate grouping may requires two tags in common, and a tight grouping requires three or more sequential text element sections.

Using a desired type of grouping, the document may be re-structured using at least one element section from the document based upon at least one matching tag between the element sections in accordance with the type of grouping that is used. The above is only one example of how a re-structured version of text of a document may be generated using a text summarization method.

In one example, the processor of the apparatus 104 may perform an evaluation of the effectiveness of each one of the text summarization methods using objective scoring. For example, currently there is no available apparatus or method that provides an objective comparison of different text summarization methods for a particular application. Different text summarization methods may be more effective for one type of application than another type of application.

In one example, the accuracy of each one of the text summarization methods that are used may be computed. The percentage of elements used in the re-structured versions of text versus the accuracy may be graphed for each one of the text summarization methods. In one example, the accuracy may be based on a correlation with a ground truthed segmentation by a topical expert of the document that is being re-structured. In other words, a topical expert may manually generate re-structured versions of text and the re-structured versions of text generated by the text summarization method may be compared to the manually generated re-structured versions of text for a measure of accuracy.

In one example, an effectiveness score for each one of the text summarization methods may be calculated by the processor of the apparatus 104 using the graph described above to determine a text summarization method that has a highest effectiveness score for a particular application. In one example, the effectiveness score may also be calculated for all possible combinations or ensembles of text summarization methods. In one example, the processor of the apparatus 104 may perform a method for calculating an effectiveness score (E) of the summarization method. In one example, the effectiveness score (E) may be based upon a peak accuracy (a) divided by a percentage of elements in the final re-structured text that is generated ($Summ_{pct}$). Mathematically, the relationship may be expressed as $E=a/Summ_{pct}$. It should be noted that the example relationship for the effectiveness score may be different for different types of corpora. For example, Table 2 below illustrates an example of data from three text summarization methods that were analyzed as described above for a meta-tagging application:

TABLE 2

EFFECTIVENESS SCORE CALCULATION

| TEXT SUMMARIZATION METHOD | PEAK ACCURACY (a) | PERCENT OF ELEMENTS THAT ARE IN THE FINAL RE-STRUCTURED TEXT ($Summ_{pct}$) | EFFECTIVENESS SCORE ($E = a/Summ_{pct}$) |
|---|---|---|---|
| 1 | 0.80 | 0.85 | 0.94 |
| 2 | 0.90 | 0.75 | 1.20 |
| 3 | 0.95 | 0.60 | 1.58 |

As illustrated in Table 2, the text summarization method 3 would have the highest effectiveness score for a meta-tagging application. Thus, the re-structured versions of text generated by the text summarization method 3 with the highest effectiveness score would be stored in the DB 106.

In one example, a combination of the text summarization methods with the highest effectiveness score may be used to generate the re-structured versions of text. Said another way, a group of the text summarization methods with a highest effectiveness score (e.g., the top three highest scoring text summarization methods) may be used to generate the re-structured versions of text.

It should be noted that the evaluation of the text summarization methods may be re-computed by a processor when a different set of documents needs evaluation. When a different set of documents are evaluated, a different text summarization method may have a highest effectiveness score. In addition, the apparatus 104 may perform the evaluation again as new text summarization methods become available to the apparatus 104. Thus, the text summarization method that is used for a particular application to generate the re-structured versions of the text may be continually updated.

The stored re-structured versions of text may be accessed by endpoints 114 and 116 (e.g., for performing a search on the re-structured version of the texts that are stored in the DB 106) over the Internet. As a result, selecting the most effective text summarization method to generate re-structured versions of text improves the Internet, in one example, by reducing search times for a desired document. In one example, the endpoints 114 and 116 may be any endpoint, such as, a desktop computer, a laptop computer, a tablet computer, a smart phone, and the like.

In one example, the variety of different applications that may use the re-structured texts may include a meta-tagging application, an inverse query application, a moving average topical map application, a most salient portions of a text element application, a most relevant document application, a small world within a document set application, and the like. The meta-tagging application may use the re-structured texts generated by the text summarization algorithm, or methods in combination, with the highest effectiveness score to provide the highest correlation between the meta-data tags for all segments in a composite when compared to author-supplied and/or expert supplied tags.

For example, tagging of segments of text is highly dependent on the text boundaries (that is, the actual "edges" in the text segmentation). The optimal text restructuring provides the highest correlation between the meta-data tags for all segments in composite when compared to author-supplied and/or expert-supplied tags.

As an example, consider the case where an author provides keywords A, B and C for a given text element. Performing one simple segmentation into three parts results in tags {A, C, D}, {B, E, F}, and {A, B, G, H} for one meta-algorithmic approach, and the tags {A, C, D, E}, {A, B, F}, and {B, C, G, H} for a second meta-algorithmic approach. The first meta-algorithmic approach has 66.7%, 33.3% and 50% matching (for a mean of 50% matching) with the author-provided keywords, while the second meta-algorithmic approach has 50%, 66.7%, and 50% matching (for a mean of 55.6% matching) with the author-provided keywords. In this scenario, the second approach is automatically determined to be optimal.

In the inverse query application, after segments are summarized and tagged, the resultant tags are compared to the actual searches performed on the element set. The tag set that best correlates with the search set is considered the optimized tag set, and the meta-algorithmic summarization approach used is automatically decided on as the optimal one.

In the moving average topical map application, a moving average topical map connects sequential segments together into sub-sequences whenever terms are shared. Referring back to the example where the author provides keywords A, B and C for a given text element and performs one simple segmentation into three parts results in tags {A, C, D}, {B, E, F}, and {A, B, G, H} for one meta-algorithmic approach, and the tags {A, C, D, E}, {A, B, F}, and {B, C, G, H} for a second meta-algorithmic approach. The "moving average" topical map for the first example includes A for all three segments (since the middle segment is surrounded by segments both containing A) and B for the last two segments. The "moving average" for the second example includes A for the first two segments, B for the latter two segments, and C for all three segments. These moving average topical maps can be used to correct the meta-data tagging output in described above.

In the most salient portions of a text element, application results for actual searches performed on the element set are used to populate the element set with tags for the search queries. When the element set is re-structured, the re-structuring that provides the most uniform matching between section and overall saliency (as measured by percentage of actual search query terms) is deemed best. A processor may perform a method to determine the re-structuring that provides the most uniform matching between section and overall saliency by maximizing the entropy of the search term queries. In one example, the method to maximize the entropy of search term queries, e, may be performed by the processor using an example function as follows:

$$e_{SQT} = -\sum_{i=1}^{N} p(SQT_i)\log_2((p(SQT_i))$$

In the most relevant document application if the sections in the text element are individual documents, then the most relevant document is the one providing the highest density of tags per 1000 words.

In the small world within a document set application, the re-structuring that results in the highest ratio of between-cluster variance in tag terms to within-cluster variance in tag terms is considered optimal. This provides separable sections of content from the larger text element.

Figure 2:
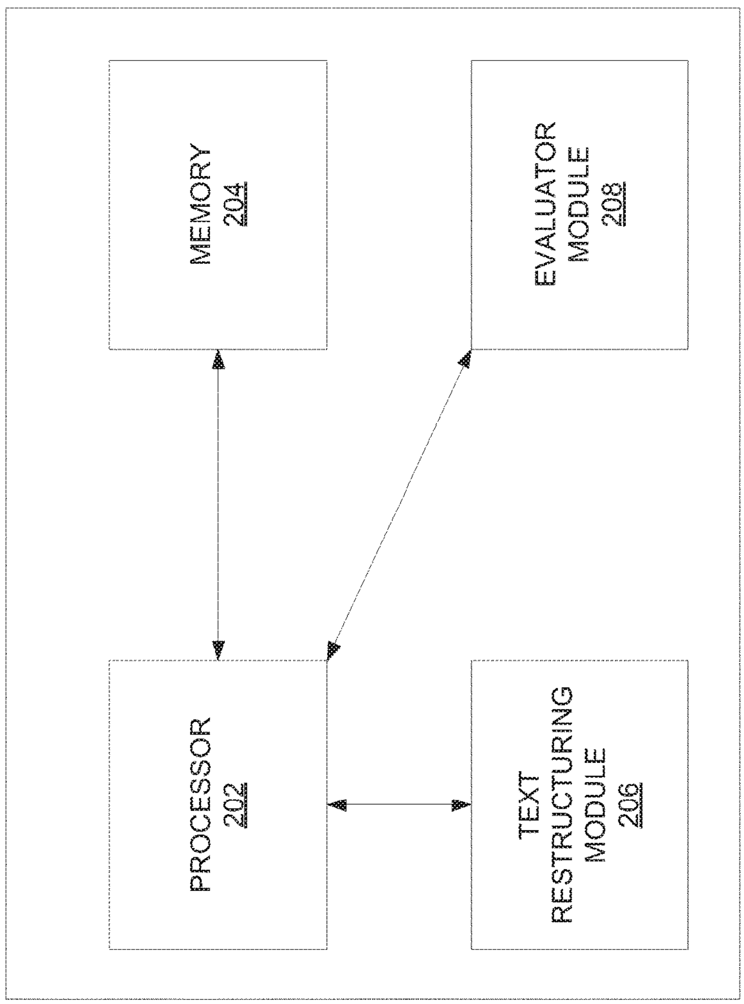
FIG. 2 is an example of an apparatus of the present disclosure.

FIG. 2 illustrates an example of the apparatus 104 of the present disclosure. In one example, the apparatus 104 includes a processor 202, a memory 204, a text re-structuring module 206 and an evaluator module 208. In one example, the processor 202 may be in communication with the memory 204, the text re-structuring module 206 and the evaluator module 208 to execute the instructions and/or perform the functions stored in the memory 204 or associated with the text re-structuring module 206 and the evaluator module 208. In one example, the memory 204 stores the plurality of re-structured versions of text for each one of the plurality of different documents that is generated by the text summarization method that has the highest effectiveness core to be used by an application, as described above.

In one example, the text re-structuring module 206 may be for generating the plurality of re-structured versions of text for each one of the plurality of different documents by applying a plurality of text summarization methods to each one of the plurality of different documents. In one example, as new text summarization methods are added or included for evaluation, the text re-structuring module 206 may generate a new re-structured version of text for each one of the plurality of documents with the new text summarization method.

In one example, the evaluator module 208 may be for calculating an effectiveness score of each one of the plurality of text summarization methods for an application that uses the plurality of re-structured versions of text and determining a text summarization method of the plurality of text summarization methods that has a highest effectiveness score. For example, the text re-structuring module 206 may be configured with the equations, functions, mathematical expressions, and the like, to calculate the effectiveness scores. As new text summarization methods are added and new re-structured versions of text are created by the text re-structuring module 206, the evaluator module 208 may calculate the effectiveness score for the new text summarization methods to determine of the new text summarization methods have the highest effectiveness score.

It should be noted that the above examples of calculating the effectiveness score is provided at only one example. Other equations or functions may be used to calculate the effectiveness score. For example, other effectiveness scores based on a deeper understanding of the function/re-purposing of the text is possible.

Figure 3:
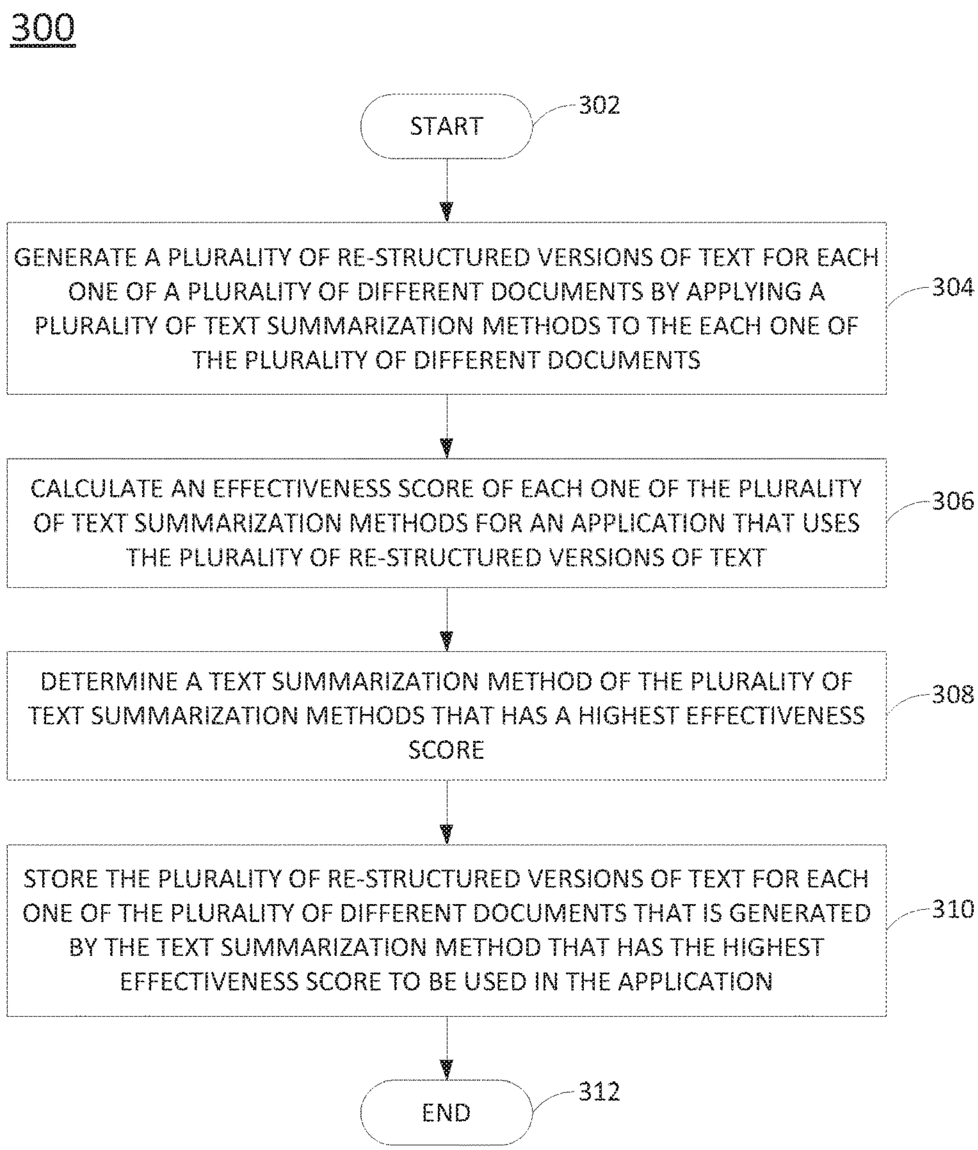
FIG. 3 is a flowchart of an example method for determining a text summarization method with a highest effectiveness score.
Figure 5:
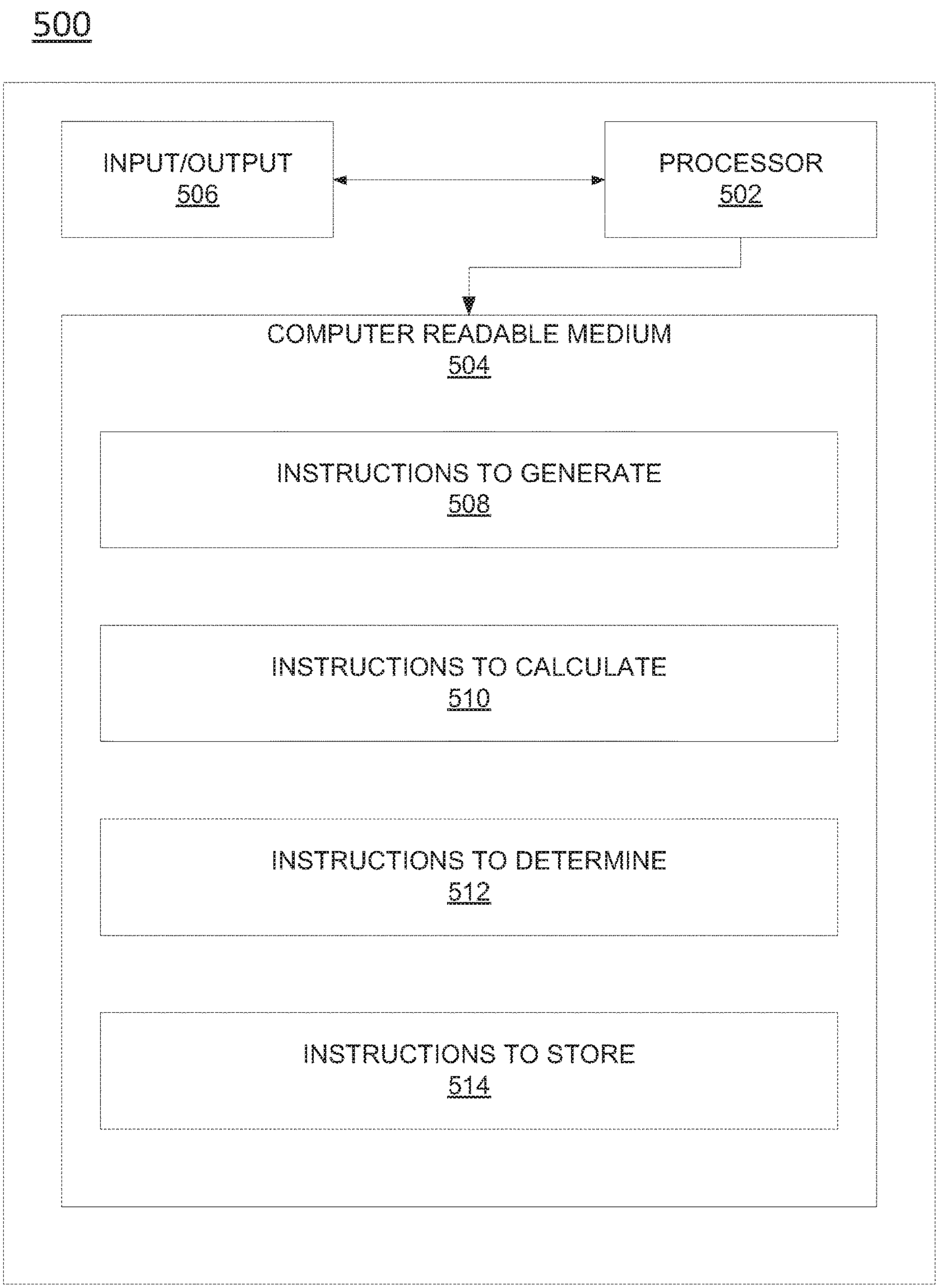
FIG. 5 is a high-level block diagram of an example computer suitable for use in performing the functions described herein.

FIG. 3 illustrates a flowchart of a method 300 for generating re-structured versions of text. In one example, the method 300 may be performed by the apparatus 104, a processor of the apparatus 104, or a computer as illustrated in FIG. 5 and discussed below.

At block 302 the method 300 begins. At block 304, a processor generates a plurality of re-structured versions of text for each one of a plurality of different documents by applying a plurality of text summarization methods to the each one of the plurality of different documents. For example, the document may be divided into segments of text elements. The each one of the text elements may include at least one tag. Then, based upon a type of grouping, the text elements may be combined based on common tags in accordance with the type of grouping to generate the re-structured versions of text.

In one example, the re-structured versions of text may be generated for each document using each text summarization method. For example, if ten different text summarization methods and 100 documents were obtained from a variety of document sources, then a re-structured version of text for each one of the 100 documents would be generated by each one of the ten different text summarization methods. In other words, 1000 re-structured versions of text would be generated for each one of the plurality of documents by applying each one of the plurality of text summarization methods to each one of the plurality of documents.

At block 306, the processor calculates an effectiveness score of each one of the plurality of text summarization methods for an application that uses the plurality of re-structured versions of text. In one example, the effectiveness score (E) of the text summarization method may be calculated based upon a peak accuracy (a) divided by a percentage of elements in the final re-structured text that is generated ($Summ_{pct}$). Mathematically the relationship may be expressed as $E=a/Summ_{pct}$.

At block 308, the processor determines a text summarization method of the plurality of text summarization methods that has a highest effectiveness score. For example, the effectiveness score of each one of the text summarization methods may be compared to one another to determine the text summarization method with the highest effectiveness score.

At block 310, the processor stores the plurality of re-structured versions of text for each one of the plurality of different documents that is generated by the text summarization method that has the highest effectiveness score to be used in the application. Thus, as new documents are found for a particular application, the system may know to use the text summarization method that was determined to have the highest score. In addition, the re-structured versions of text generated by the text summarization method that has the highest effectiveness score may be used with confidence as being the most efficient for the particular application that is used. The method 300 ends at block 312.

Figure 4:
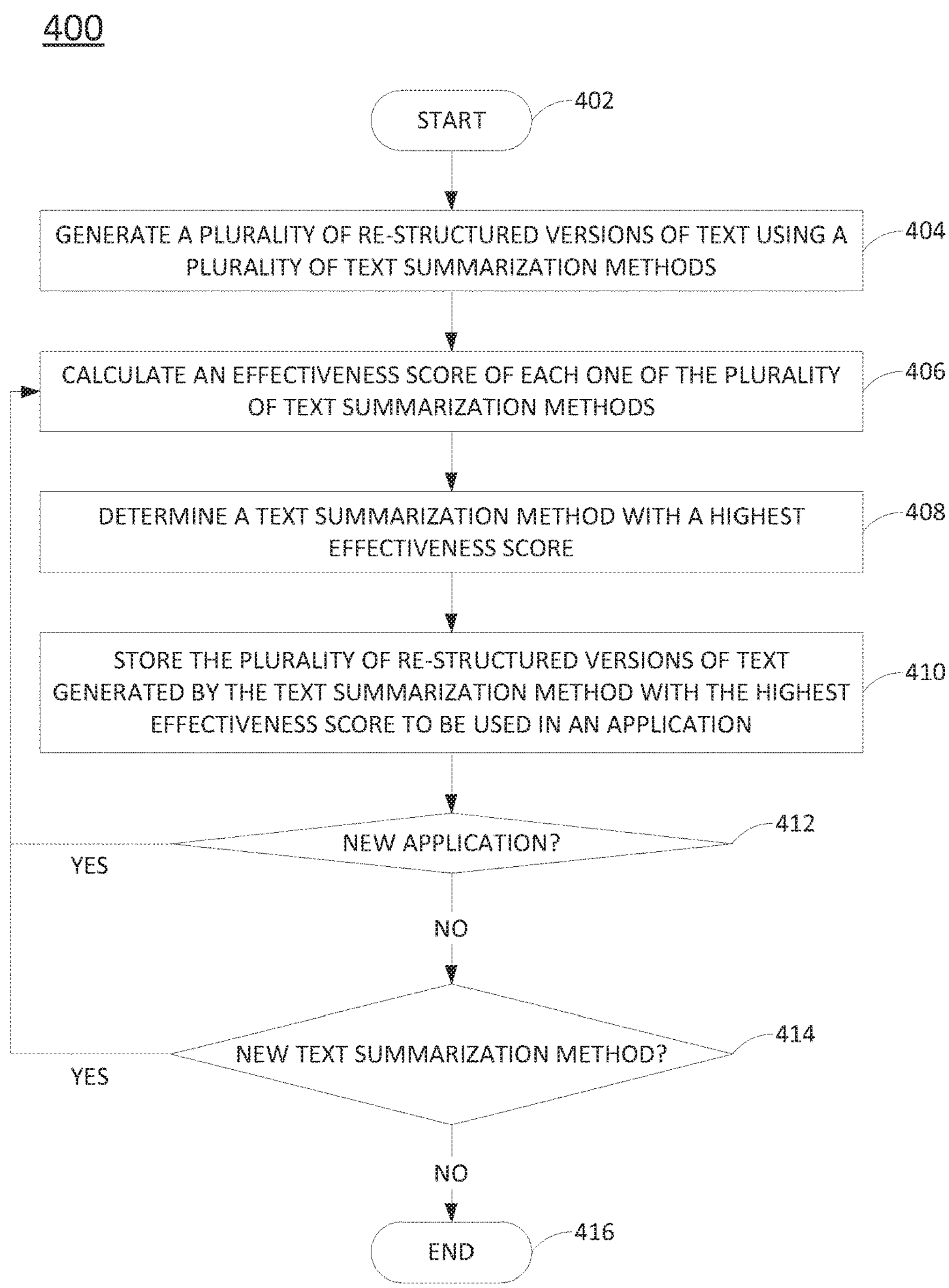
FIG. 4 is a flowchart of a second example method for determining a text summarization method with a highest effectiveness score.

FIG. 4 illustrates a flowchart of a method 400 for generating re-structured versions of text. In one example, the method 400 may be performed by the apparatus 104, a processor of the apparatus 104, or a computer as illustrated in FIG. 5 and discussed below.

At block 402 the method 400 begins. At block 404, a processor generates a plurality of re-structured versions of text for each one of a plurality of different documents by applying a plurality of text summarization methods to the each one of the plurality of different documents. As noted above, a re-structured version of text may include a filtered version, a version with selected portions of text, a prioritized version, a re-ordered version of text, a re-organized version of text, and the like. For example, the document may be divided into segments of text elements. The each one of the text elements may include at least one tag. Then based upon a type of grouping, the text elements may be combined based on common tags in accordance with the type of grouping to generate the re-structured versions of text.

In one example, the re-structured versions of text may be generated for each document using each text summarization method. For example, if ten different text summarization methods and 100 documents were obtained from a variety of document sources, then a re-structured version of text for each one of the 100 documents would be generated by each one of the ten different text summarization methods. In other words, 1000 re-structured versions of text would be generated for each one of the plurality documents by applying each one of the plurality of text summarization methods to each one of the plurality of documents.

At block 406, the processor calculates an effectiveness score of each one of the plurality of text summarization methods for an application that uses the plurality of re-structured versions of text. In one example, the effectiveness score (E) of the text summarization method may be calculated based upon a peak accuracy (a) divided by a percentage of elements in the final re-structured text that is generated ($Summ_{pct}$). Mathematically the relationship may be expressed as $E=a/Summ_{pct}$.

At block 408, the processor determines a text summarization method of the plurality of text summarization methods that has a highest effectiveness score. For example, the effectiveness score of each one of the text summarization methods may be compared to one another to determine the text summarization method with the highest effectiveness score.

At block 410, the processor stores the plurality of re-structured versions of text for each one of the plurality of different documents that is generated by the text summarization method that has the highest effectiveness score to be used in the application. Thus, as new documents are found for a particular application the system may know to use the text summarization method that was determined to have the highest score. In addition, the re-structured versions of text generated by the text summarization method that has the highest effectiveness score may be used with confidence as being the most efficient for the particular application that is used.

At block 412, the processor determines if a new application is to be applied for the text summarization methods. If a new application is to be applied, then the method 400 may return to block 406 to calculate an effectiveness score of each one of the plurality of text summarization methods. As noted above, the effectiveness score of the text summarization methods may change depending on the application.

If a new application is not applied, the method 400 may proceed to block 414. At block 414, the processor determines whether a new text summarization method is available. If a new text summarization method is available, then the method 400 may return to block 406 to calculate an effectiveness score of each one of the plurality of text summarization methods. In one example, the effectiveness score may only be calculated for the new text summarization method since the existing plurality of text summarization methods had the effectiveness score previously calculated. The addition of a new summarization technique, however, may lead to a plurality of new effectiveness scores being calculated for the new summarization engine itself, and for the new summarization engine in any combination, ensemble or meta-algorithm with other existing summarization engines that had already been ingested in the system architecture.

If no new text summarization method is available, then the method 400 may proceed to block 416. At block 416, the method 400 ends.

It should be noted that although not explicitly specified, one or more blocks, functions, or operations of the methods 300 and 400 described above may include a storing, displaying and/or outputting block as required for a particular application. In other words, any data, records, fields, and/or intermediate results discussed in the methods can be stored, displayed, and/or outputted to another device as required for a particular application. Furthermore, blocks, functions, or operations in FIG. 4 that recite a determining operation, or involve a decision, do not necessarily require that both branches of the determining operation be practiced.

FIG. 5 depicts a high-level block diagram of a computer that can be transformed to into a machine that is dedicated to perform the functions described herein. Notably, no computer or machine currently exists that performs the functions as described herein.

As depicted in FIG. 5, the computer 500 comprises a hardware processor element 502, e.g., a central processing unit (CPU), a microprocessor, or a multi-core processor; a non-transitory computer readable medium, machine readable memory or storage 504, e.g., random access memory (RAM) and/or read only memory (ROM); and various input/output user interface devices 506 to receive input from a user and present information to the user in human perceptible form, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like.

In one example, the computer readable medium 504 may include a plurality of instructions 508, 510, 512 and 514. In one example, the instructions 508 may be instructions to generate a plurality of re-structured versions of text for each one of a plurality of different documents by applying a plurality of text summarization methods to the each one of the plurality of different documents. In one example, the instructions 510 may be instructions to calculate an effectiveness score of each one of the plurality of text summarization methods for an application that uses the plurality of re-structured versions of text. In one example, the instructions 512 may be instructions to determine a text summarization method of the plurality of text summarization methods that has a highest effectiveness score. In one example, the instructions 514 may be instructions to store the plurality of re-structured versions of text for each one of the plurality of different documents that is generated by the text summarization method that has the highest effectiveness score to be used in the application.

Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the blocks of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed methods. In one example, instructions 508, 510, 512 and 514 can be loaded into memory 504 and executed by hardware processor element 502 to implement the blocks, functions or operations as discussed above in connection with the example methods 300 or 400. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the instructions 508, 510, 512 and 514, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:

generating, by a processor, a plurality of re-structured versions of text for each one of a plurality of different documents by applying a plurality of text summarization methods to the each one of the plurality of different documents, wherein the generating for each one of the plurality of different documents, comprises:

breaking, by the processor, a document into a plurality of different sections of text elements;

applying, by the processor, at least one tag to each one of the plurality of different sections of text elements;

selecting, by the processor, a grouping type to apply to the at least one tag of the each one of the plurality of different sections of text elements; and using, by the processor, at least one of the plurality of different sections of text elements in a re-structured version of the document based on the grouping type that is selected;

calculating, by the processor, an effectiveness score of each one of the plurality of text summarization methods for an application that uses the plurality of re-structured versions of text;

determining, by the processor, a text summarization method of the plurality of text summarization methods that has a highest effectiveness score;

storing, by the processor, the plurality of re-structured versions of text for each one of the plurality of different documents that is generated by the text summarization method that has the highest effectiveness score to be used in the application;

receiving, by the processor, a search request from an endpoint device;

performing, by the processor, a search on the plurality of re-structured versions of text generated by the text summarization method that has the highest effectiveness score in response to the search request; and providing, by the processor, one of the plurality of re-structured versions of text to the endpoint device based on the search that is performed.

2. The method of claim 1, further comprising:

generating, by the processor, a new re-structured version of the text for each one of the plurality of documents with a new text summarization method;

calculating, by the processor, the effectiveness score of the new text summarization method;

determining, by the processor, that the effectiveness score of the new text summarization method is higher than text summarization method that had the highest effectiveness score; and storing, by the processor the new re-structured version of the text for each one of the plurality of documents to be used in the application.

3. The method of claim 1, wherein the effectiveness score is calculated based on a peak accuracy divided by a percent of an element used in the text summarization method.

4. The method of claim 1, wherein the plurality of text summarization methods include a meta-summarization algorithm, wherein the meta-summarization algorithm uses two or more text summarization methods.

5. The method of claim 1, wherein the text summarization method with the highest effective score is different for a different application.

6. The method of claim 1, wherein the application comprises at least one of: a meta-tagging application, an inverse query application, a moving average topical map application, a most salient portion of a text element application, a most relevant document application or a small world within a document set application.

7. An apparatus comprising:

a text re-structuring module for generating a plurality of re-structured versions of text for each one of a plurality of different documents by applying a plurality of text summarization methods to the each one of the plurality of different documents, wherein generating for each one of the plurality of different documents comprises breaking a document into a plurality of different sections of text elements, applying at least one tag to each one of the plurality of different sections of text elements, selecting a grouping type to apply to the at least one tag of the each one of the plurality of different sections of text elements, and using at least one of the plurality of different sections of text elements in a re-structured version of the document based on the grouping type that is selected;

an evaluator module for calculating an effectiveness score of each one of the plurality of text summarization methods for an application that uses the plurality of re-structured versions of text and determining a text summarization method of the plurality of text summarization methods that has a highest effectiveness score;

a memory for storing the plurality of re-structured versions of text for each one of the plurality of different documents that is generated by the text summarization method that has the highest effectiveness score to be used in the application; and a processor for executing the text re-structuring module, the evaluator module and the application using the plurality of re-structured versions of text stored in the memory, wherein the processor is to receive a search request from an endpoint device, perform a search on the plurality of re-structured versions of text generated by the text summarization method that has the highest effectiveness score in response to the search request, and provide one of the plurality of re-structured versions of text to the endpoint device based on the search that is performed.

8. The apparatus of claim 7, wherein the text re-structuring module generates a new re-structured version of text for each one of the plurality of documents with a new text summarization method, the evaluator module calculates the effectiveness score of the new text summarization method and determines that the effectiveness score of the new text summarization method is higher than text summarization method that had the highest effectiveness score and the memory stores the new re-structured version of the text for each one of the plurality of documents to be used in the application.

9. The apparatus of claim 7, wherein the effectiveness score is calculated based on a peak accuracy divided by a percent of an element used in the text summarization method.

10. The apparatus of claim 7, wherein the plurality of text summarization methods include a meta-summarization algorithm, wherein the meta-summarization algorithm uses two or more text summarization methods.

11. The apparatus of claim 7, wherein the text summarization method with the highest effective score is different for a different application.

12. The apparatus of claim 7, wherein the application comprises at least one of: a meta-tagging application, an inverse query application, a moving average topical map application, a most salient portion of a text element application, a most relevant document application or a small world within a document set application.

13. A non-transitory machine-readable storage medium encoded with instructions executable by a processor, the machine-readable storage medium comprising:

instructions to generate a plurality of re-structured versions of text for each one of a plurality of different documents by applying a plurality of text summarization methods to the each one of the plurality of different documents;

instructions to calculate an effectiveness score of each one of the plurality of text summarization methods for an application that uses the plurality of re-structured versions of text;

instructions to determine a text summarization method of the plurality of text summarization methods that has a highest effectiveness score;

instructions to store the plurality of re-structured versions of text for each one of the plurality of different documents that is generated by the text summarization method that has the highest effectiveness score to be used in the application;

instructions to receive a search request from an endpoint device;

instructions to perform a search on the plurality of re-structured versions of text generated by the text summarization method that has the highest effectiveness score in response to the search request; and instructions to provide one of the plurality of re-structured versions of text to the endpoint device based on the search that is performed.

* * * * *